US00RE42404E

(19) United States
(12) Reissued Patent
Dooley

(10) Patent Number: US RE42,404 E
(45) Date of Reissued Patent: May 31, 2011

(54) MULTIPLE SIGNATURE FEEDER SYSTEM

(75) Inventor: Ronald E. Dooley, Mattoon, IL (US)

(73) Assignee: R.R. Donnelley & Sons, Chicago, IL (US)

(21) Appl. No.: 10/616,684

(22) Filed: Jul. 10, 2003

Related U.S. Patent Documents

Reissue of:
(64) Patent No.: 6,257,566
Issued: Jul. 10, 2001
Appl. No.: 09/073,487
Filed: May 6, 1998

(51) Int. Cl.
*B65H 39/043* (2006.01)

(52) U.S. Cl. ..... 270/52.18; 270/52.16; 270/52.29; 270/52.14; 271/3.03

(58) Field of Classification Search ..... 270/1.02, 270/1.03, 52.14, 52.19, 52.2, 52.26, 52.29, 270/1.01, 52.16, 52.18, 58.29, 58.23, 58.26, 270/52.22; 271/3.01, 9.01, 9.02, 9.13; 221/10
See application file for complete search history.

(56) References Cited

U.S. PATENT DOCUMENTS 3,841,622 A 10/1974 Swanson
4,208,666 A 6/1980 Paranjpe
4,801,036 A 1/1989 Rathert
4,903,600 A 2/1990 Long
5,088,711 A 2/1992 Newsome
5,114,128 A * 5/1992 Harris et al. ..... 270/1.03
5,280,895 A 1/1994 Meier
5,458,323 A 10/1995 Magee et al.
5,503,382 A 4/1996 Hansen et al.
5,678,813 A * 10/1997 Osako et al. ..... 270/52.16
5,727,781 A * 3/1998 Muller ..... 270/58.23
6,267,366 B1 7/2001 Graushar et al.

* cited by examiner

*Primary Examiner* — Leslie A Nicholson, III
(74) *Attorney, Agent, or Firm* — Hanley, Flight and Zimmerman, LLC

(57) ABSTRACT

A binding line having increased capacity and increased flexibility to deliver customized or personalized signatures to the gathering conveyor in order to customize or personalizes the content of a book to appeal to targeted demographic groups or individuals. The binding line includes a gathering conveyor, a plurality of packer boxes positioned along the gathering conveyor, each of the packer boxes being adapted to deliver a distinct signature to the conveyor, and a feeder system operatively associated with at least one of the packer boxes. The feeder system includes a feed conveyor and a plurality of feeder boxes, each of the feeder boxes being adapted to deliver a selected signature to the associated packer box. A primary controller is provided for activating a selected set of the packer boxes, thereby delivering a set of signatures to the gathering conveyor. The primary controller further activates a selected one of the feeder boxes, thereby delivering a selected signature from the feeder system to the selected packer box. Preferably, a printer is provided for imprinting a customized or personalized message on each of the signatures selected from the feeder system prior to delivery to the associated packer box.

38 Claims, 3 Drawing Sheets

MULTIPLE SIGNATURE FEEDER SYSTEM

Matter enclosed in heavy brackets [ ] appears in the original patent but forms no part of this reissue specification; matter printed in italics indicates the additions made by reissue.

FIELD OF THE INVENTION

The present invention relates generally to a binding line for binding large circulation periodicals, catalogs, books and other printed materials. More specifically, the present invention relates to a binding line having a multiple signature feeder system, which greatly expands the capacity and flexibility of the binding line.

BACKGROUND OF THE INVENTION

Books and most large circulation periodicals are simply a collection of forms or signatures that have been bound together into what is commonly referred to as a book. Each signature consists of a bundle of printed pages, and includes a backbone, a head, a foot, and a pair of folios. The signatures are gathered on a binding line in a particular order, and are then stitched or glued together to form the book.

The binding line typically includes a plurality of packer boxes positioned along a gathering conveyor, with each packer box or a selected set of packer boxes delivering printed signatures seriatim onto the gathering conveyor via a rotary drum as is well known in the art. After binding, the signatures are trimmed, bundled and shipped using well known methods. A more detailed explanation of the binding line process can be found in U.S. Pat. No. 5,458,323.

Using computer control systems, it is now possible to customize a book or a magazine in order to target a particular demographic group. This is typically accomplished by selectively enabling and disabling selected packer boxes along the binding line, so that a signature designed to appeal to the targeted demographic group is inserted into the book at a designated location.

It is also possible to further customize the finished book by customizing or personalizing one or more of the signatures. A printhead is positioned to apply a customized or personalized message, such as the name and address of a magazine subscriber, to a blank reserved area on the signature prior to placement in the packer box. The only requirements are that the signatures inhabit the same location within the book, and that the blank reserved area on each of the signatures occupy the same location relative to the head and the foot in order to be functional with the printhead.

Although it is very desirable to have customized or personalized signatures, physical and financial constraints severely hamper the capacity, and hence the flexibility, of the binding line. The capacity of the binding line is limited by a number of factors, including the length of the binding line and the number of packer boxes available. Space and cost considerations frequently make it impractical, if not impossible, to add packer boxes beyond a certain number. Expansion of the binding line, or installation of a new binding line, represents a significant capital investment, and in many cases would require a new building to accommodate the larger binding line. Accordingly, there exists a need for a convenient and cost effective way to increase the flexibility of a new or an existing binding tine to produce customized and personalized printed materials.

SUMMARY OF THE INVENTION

The present invention greatly expands the capacity as well as the flexibility of a conventional binding line to produce customized books targeted to appeal to a chosen demographic group, or books that are customized or personalized in accordance with other criteria. A feeder system having a plurality of feeder boxes or hoppers is positioned upstream of a conventional packer box. A feed controller operatively connected to a primary system controller activates a selected one of the feeder boxes, so that the distinct signature contained in that selected feeder box is delivered via a feed conveyor to the associated packer box. A printer disposed along the feed conveyor permits a customized or personalized message, such as the name and address of a magazine subscriber, renewal notices, or discount, shipping and credit features, to be applied to each signature prior to delivery to the associated packer box.

Thus, a selected one of the feeder boxes can be selected to deliver its distinct signature to the associated packer box for placement in the book at a designated location. The signature is then further customized or personalized by adding a predetermined printed message, which reads in the same orientation as the signature text. Accordingly, the flexibility of the binding line to produce customized or personalized books is greatly enhanced at minimal additional cost.

According to one aspect of the invention, a binding line for gathering a plurality of signatures to form a book includes a gathering conveyor, a plurality of packer boxes positioned along the gathering conveyor, and a feeder system operatively associated with at least one of the packer boxes. The feeder system includes a feed conveyor and a plurality of feeder boxes, each of the feeder boxes containing a distinct signature and being adapted to deliver its distinct signature to the associated packer box. A primary controller is operatively connected to the packer boxes for activating a selected set of packer boxes, thereby delivering a set of signatures to the gathering conveyor. The controller further activates a selected one of the feeder boxes, thereby delivering the distinct signature from that feeder box to the associated packer box for placement in the book at the designated location. Each of the selected signatures delivered from the feeder system includes a backbone and a blank reserved portion, and a printer is positioned to apply a predetermined printed message to the reserved portion of the selected signature, perpendicular to the backbone, prior to delivery to the associated packer box. A feed system controller, connected to the primary system controller, is connected to the printer and determines the content of the printed message. The printer is preferably disposed adjacent the output end of the feed conveyor.

According to another aspect of the invention, a feeder system for expanding the capacity of a binding line is disclosed. The binding line typically includes a plurality of packer boxes positioned along a gathering conveyor, the gathering conveyor being adapted to gather signatures to form a book. The feeder system includes a plurality of feeder boxes associated with at least one of the packer boxes, and each of the feeder boxes contains a distinct signature and is adapted to deliver its distinct signature to the associated packer box. A feed conveyor delivers the signatures from the feeder boxes to the associated packer box. A primary controller activates a selected set of the packer boxes, thereby delivering a selected set of signatures to the gathering conveyor. The controller further activates a selected one of the feeder boxes, thereby delivering a selected signature from the feeder system to the associated packer box.

According to yet another aspect of the invention, a binding line for gathering a plurality of signatures to form a book comprises a gathering conveyor, a plurality of packer boxes positioned along the gathering conveyor, a primary controller for activating a selected set of packer boxes to thereby deliver a set of signatures to the gathering conveyor, and adjustable feed means associated with at least one of the packer boxes for delivering a selected signature to the associated packer box. The adjustable feed means includes a plurality of feeder boxes, and a feed controller operatively connected to the primary controller. The feed controller causes a selected one of the feeder boxes to deliver its distinct signature to the associated packer box for placement in the book.

According to still another aspect of the invention, a method for expanding the capacity of a binding line is disclosed. The binding line is adapted to gather a plurality of signatures to form a book, and includes a plurality of packer boxes positioned along a gathering conveyor. The binding line further includes a primary controller for selectively enabling and disabling sets of packer boxes. The method includes the steps of operatively connecting a plurality of feeder boxes to a selected one of the packer boxes, positioning a feed conveyor adjacent the feeder boxes, and connecting a feed controller to the primary controller. The feed controller is adapted to activate a selected one of the feeder boxes to thereby deliver a selected signature to the feed conveyor for delivery to the associated packer box.

These and other objects, features and advantages of the present invention will become readily apparent to those skilled in the art upon a reading of the following detailed description and the appended claims.

DETAILED DESCRIPTION OF THE PREFERRED EMBODIMENT

Figure 1:
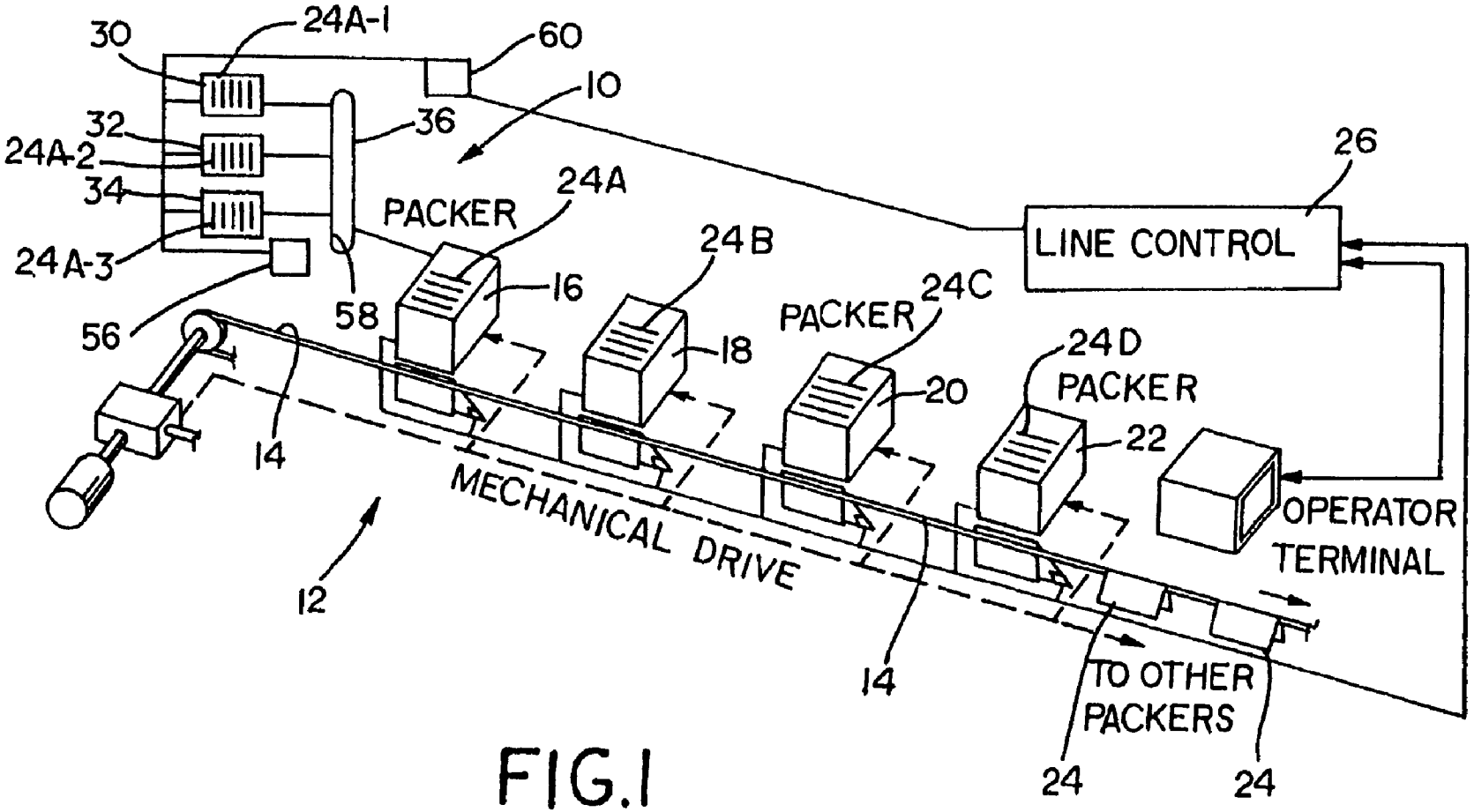
FIG. 1 is a schematic view of a typical binding line with an expanded feeder system according to the present invention.

The following detailed description is not intended to limit the scope of the invention to the precise form disclosed. Instead, the embodiment illustrated herein has been chosen and described in order to best explain the principles of the invention so that others skilled in the an may follow its teachings.

Referring now to the drawings, a feeder system incorporating the features of the present invention is generally referred to by the reference numeral 10, and is shown operatively connected to a binding line 12 of the type commonly employed in the art. Binding line 12 includes a gathering chain or conveyor 14 which is moveable past a plurality of packer boxes 16, 18, 20, 22, etc. The gathering conveyor 14 includes a plurality of chain spaces (not shown), each of which is adapted to gather a signature 24 (shown in FIG. 3) from at least some of the packer boxes 16, 18, 20, 22, etc., in seriatim fashion. Although only four packer boxes 16, 18, 20 and 22 are shown, it will be understood that the typical binding line 12 may include more or fewer packer boxes depending on the size of the binding line 12. A controller 26, which is preferably a programmable logic controller or a similar controller of the type commonly employed in printing operations, controls the operation of the binding line 12. Typically, each of the packer boxes is adapted to hold a distinct signature as will be explained in greater detail below, and the signatures are fed to the gathering conveyor in a manner well known to those skilled in the art. For example, packer boxes 16, 18, 20, 22 contain distinct signatures 24a, 24b, 24c and 24d, respectively. Upon direction of the controller 26, one or more of the packer boxes is enabled, thereby delivering its signature to the gathering conveyor 14. As is well known, the controller 26 typically activates a selected set of packer boxes, for example, packer boxes 16 and 20, so that only the signatures contained in the chosen set of packer boxes (in this case signatures 24a and 24c) are delivered to the gathering conveyor 14 for assembly into the book. A more detailed explanation of the binding line 12, as well as its operation and component parts can be found in U.S. Pat. No. 5,458,323, the disclosure of which is incorporated herein by reference.

Figure 2:
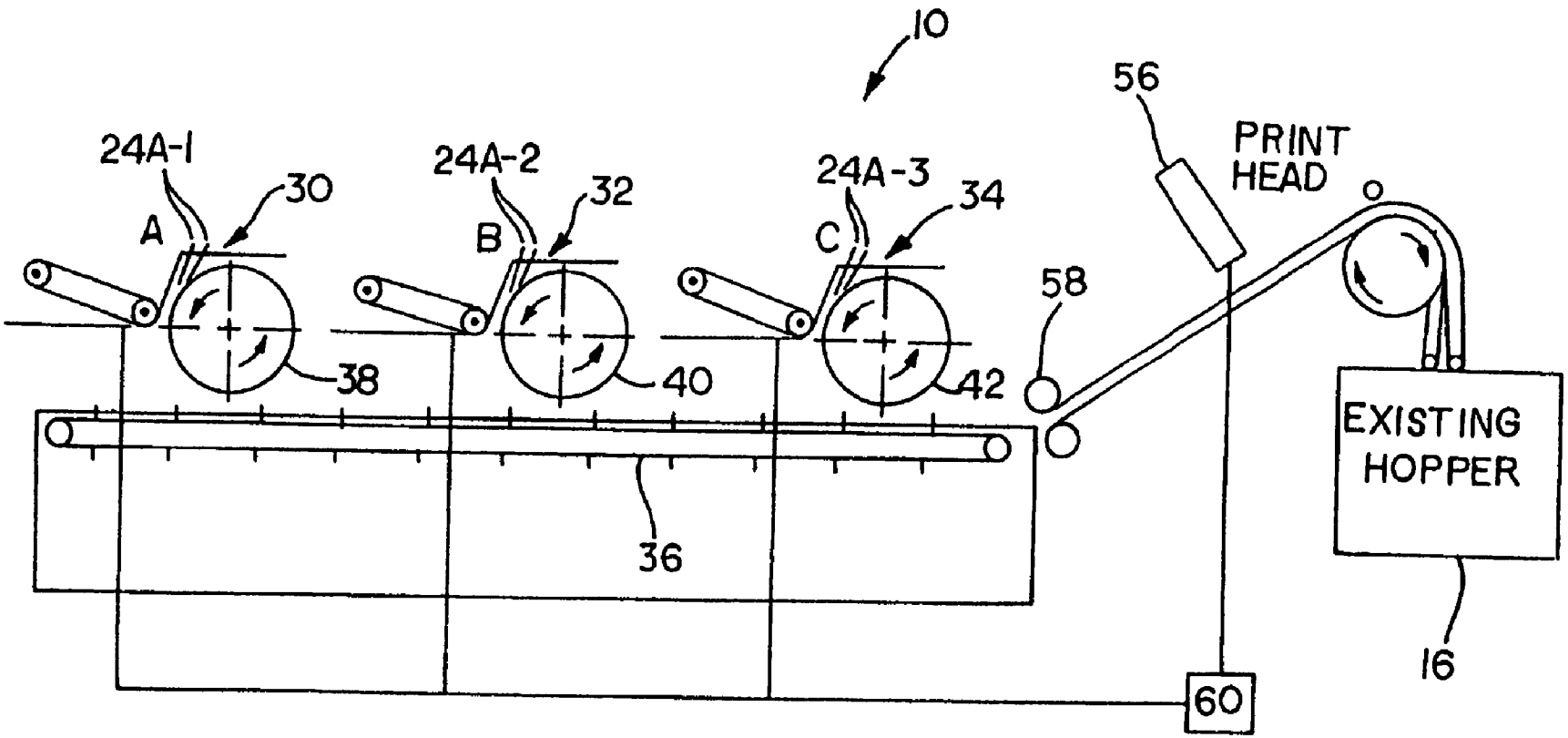
FIG. 2 is a schematic view of the feeder system of the present invention for use with the binding line shown in FIG. 1.

FIG. 2 shows the feeder assembly 10 incorporating the features of the present invention, which is adapted to be operatively associated with at least one of the packer boxes 16, 18, 20, 22, etc., and is connected to the controller 26. The feeder assembly 10 includes a plurality of feeder hoppers or boxes 30, 32, 34, etc. Although three such feeder boxes are shown, it will be understood that more or fewer feeder boxes may be employed depending on the requirements of the contemplated application. For purposes of explanation, only the feeder assembly 10 associated with the packer box 16 will be described in detail. However, it will be understood that the remaining packer boxes may also have such a feeder assembly associated therewith.

Figure 3:
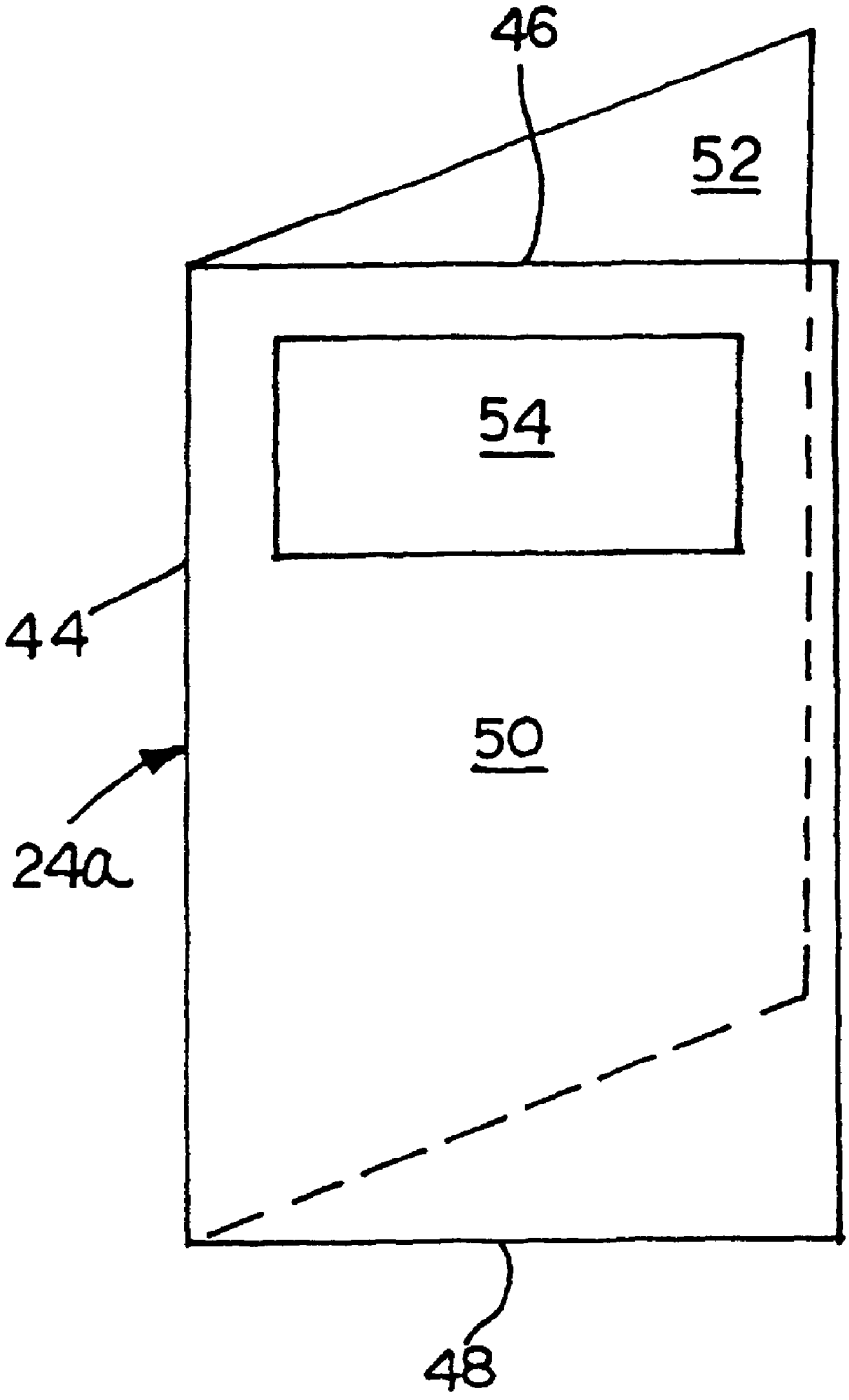
FIG. 3 is an enlarged perspective view showing a signature and illustrating the blank reserved portion on one of the signature folios which receives a printed message from the printer associated with the feeder assembly.

The feeder assembly 10 includes a feed conveyor 36 having a plurality of spaces, each of which is adapted to gather a signature, for example, 24a-1, 24a-2, or 24a-3, from the feeder boxes 30, 32, 34 via conventional rotary drum assemblies 38, 40, 42, and deliver the selected signature to the associated packer box 16. Preferably, each of the distinct signatures 24a-1, 24a-2 and 24a-3 is designated for insertion into the book at the same designated location. Upon direction of the controller 26, one of the distinct signatures 24a-1, 24a-2, or 24a-3, is selected for delivery to the associated packer box 16, for insertion into the book in the location reserved for signature 24a. As shown in FIG. 3, a conventional signature 24 includes a backbone 44, a head 46, a foot 48, and a pair of folios 50 and 52. In the case of the signatures 24a (in this case, signatures 24a-1, 24a-2 and 24a-3) there may be included a blank reserved area such as 54 on one of the folios, in this case folio 50. It will be understood that the remaining portion of folio 50 outside of the reserved area 54 will typically include text graphics, or other printed matter. A printer 56 is disposed adjacent an output end 58 of the feed conveyor 36, and is positioned so that the printer 56 will print a printed message or other graphic material onto the reserved portion 54 of the selected signature (e.g., signature 24a-1, 24a-2, or 24a-3) prior to the delivery of the signature from its feeder box 30, 32, 34, respectively, to the associated packer box 16. The feeder boxes 30, 32 and 34, as well as the printer 56 are connected to a controller 60, which is operatively connected to the controller 26 in a well known manner. The content of the printed message to be applied to the reserved portion 54 of the signatures 24a-1, 24a-2, and 24a-3 is programmed into the controller 60. Accordingly, based upon the information programmed into the controllers 26 and 60, one of the packer boxes 30, 32, 34 is activated to deliver its signature 24a-1, 24a-2 or 24a-3 to the feed conveyor 36, and the signature so selected is customized or personalized with the addition of a printed message or graphics to the reserved portion 54 by the printer 56.

In operation, the printing line 12 operates in a conventional manner to assemble a book. The controller 26 enables and disables a selected set of the packer boxes, in order to deliver signatures to the gathering conveyor 14. For example, either of packer boxes 16 or 18 may be activated to deliver its respective signature 24a or 24b. If signatures 24a and 24b are both designated to occupy the same location in the book, only one of the packer boxes 16, 18 will be activated a given time, as is known to those skilled in the art. Other packer boxes (not shown) may be activated all of the time, while still other packer boxes (not shown) may be grouped in sets of two, three, etc.

As outlined above, the packer box 16 delivers signatures designated 24a to the gathering conveyor 14. With the addition of the feed assembly 10, the packer box 16 can be made to deliver any one of the separate and distinct signatures 24a-1, 24a-2, or 24a-3, to the packer box 16 for insertion into a particular book at the location reserved for signature 24a. Consequently, whereas the packer box 16 could before deliver only a single signature, i.e., 24a, to the designated location, with the addition of the feeder assembly 10 the packer box 16 can now also deliver any of three other distinct signatures. i.e., 24a-1, 24a-2 or 24a-3. The controllers 26 and 60 determine which of the packer boxes, and hence which of the feeder boxes, will be activated.

The printer 56 located at the output end 58 of the feed conveyor enables further customization or personalization of the signatures. For example, the controllers 26 and 60 may activate the packer box 16 and feeder box 30 to deliver signature 24a-1. The controller 60 then directs the printer 56 to apply a magazine subscriber's name and address to the reserved portion 54 as the signature 24a-1 is delivered from the feed conveyor 36 to the packer box 16. Immediately thereafter, for the next book being produced, the controllers 26 and 60 may again activate the packer box 16 and feeder box 30 to deliver signature 24a-1. However, for this next signature the controller 60 directs the printer 56 to apply a different name and address to the reserved portion 54 of the signature 24a-1 as the signature is delivered from the feed conveyor 36 to the packer box 16. Consequently, the first delivered copy of signature 24a-1 is separate and distinct from the second delivered copy of signature 24a-1 by virtue of the separate and distinct printed message applied to the reserved portion 54. The signatures delivered from feeder boxes 32 and 34 can be distinguished in a like manner.

The foregoing description is not intended to limit the scope of the invention to the precise form disclosed. It is contemplated that various changes and modifications may be made by those skilled in the art without departing from the scope of the following claims.

What is claimed:

1. A binding line for gathering a plurality of signatures to form a book, comprising:

a gathering conveyor;

a plurality of packer boxes positioned along the conveyor, each of the packer boxes being adapted to deliver a signature to the conveyor;

a feeder system operatively associated with at least one of the packer boxes, the feeder system including a feed conveyor and a plurality of feeder boxes, each of the feeder boxes being adapted to deliver a distinct signature to the associated packer box; *and* a control system operatively connected to the packer boxes and being adapted to activate the packer boxes to thereby deliver a set of signatures to the gathering conveyor, the control system further being operatively connected to the feeder boxes and being adapted to activate a selected one of the feeder boxes to thereby deliver a selected one of the distinct signatures from the feeder system to the associated packer box.

2. The device of claim 1, each of the selected signatures delivered from the feeder system having a blank reserved portion, and wherein the feeder system includes a printer positioned to apply a predetermined printed message to the reserved portion of the selected signature prior to delivery to the associated packer box.

3. The device of claim 2, each of the selected signatures having a backbone, the printer being positioned to apply the printed message perpendicular to the backbone.

4. The device of claim 2, wherein the control system includes a feed system controller operatively connected to the printer, the feed system controller for determining the content of the printed message.

5. The device of claim 2, wherein the feed conveyor includes an output end for delivering the selected signature from the selected feeder box to the associated packer box, and including a printer disposed adjacent the conveyor output end.

6. For use with a binding line having a plurality of packer boxes positioned along a gathering conveyor, a feeder system for feeding at least one of the packer boxes comprising:

a plurality of feeder boxes associated with the one packer box, each of the feeder boxes being adapted to contain a distinct signature, each of the feeder boxes being adapted to deliver the distinct signature to a feed conveyor, the feed conveyor being adapted to receive the distinct signatures from the feeder boxes and to deliver the signatures from the feeder boxes to the associated packer box; and a primary controller for activating the packer boxes to thereby deliver a selected set of signatures to the gathering conveyor, the primary controller being operatively connected to a feed system controller for activating a selected one of the feeder boxes to thereby deliver a selected one of the distinct signatures from the plurality of feeder boxes to the associated packer box.

7. The device of claim 6, each of the signatures in the feeder boxes having a blank reserved portion, and including a printer positioned adjacent the feed conveyor for applying a predetermined printed message to the reserved portion of the selected signature prior to delivery to the associated packer box.

8. The device of claim 7, each of the selected signatures having a backbone, the printer being positioned to apply the printed message perpendicular to the backbone.

9. The device of claim 7, wherein the feed system controller is operatively connected to the printer, the feed system controller being adapted to determine the content of the printed message.

10. The device of claim 7, wherein the feed conveyor includes an output end for delivering the selected signature from the selected feeder box to the associated packer box, and wherein the printer is disposed adjacent the conveyor output end.

11. A binding line for gathering a plurality of signatures to form a book, comprising:

a gathering conveyor;

a plurality of packer boxes positioned along the conveyor, each of the packer boxes being adapted to deliver a distinct signature to the conveyor;

a primary controller for activating a selected set of packer boxes to thereby deliver a set of signatures to the gathering conveyor; *and* adjustable feed means associated with at least one of the packer boxes for delivering a selected signature to the associated packer box, the feed means including a plurality of feeder boxes and having a feed controller operatively connected to the primary controller, the feed controller for causing a selected one of the feeder boxes to deliver a selected signature to the associated packer box.

12. A method for expanding the capacity of a binding line comprising the steps of:

providing a binding line adapted to gather a plurality of signatures to form a book and having a plurality of packer boxes positioned along a gathering conveyor[;] operatively connecting a plurality of feeder boxes to a selected one of the packer boxes;

positioning a feed conveyor adjacent the feeder boxes; and controlling the feeder boxes to thereby deliver a selected signature to the feed conveyor for delivery to the selected one of the packer boxes.

13. The method of claim 12, including the additional step of applying printed material to the selected signature prior to delivering the selected signature to the selected one of the packer boxes.

14. The method of claim 13, the binding line further including a primary controller for selectively enabling and disabling sets of the packer boxes, and including a feed controller connected to the primary controller for activating the feeder boxes.

15. The method of claim 14, including a printer disposed adjacent an output end of the feed conveyor, and including the additional step of programming a controller to apply distinct printed material to each selected signature.

*16. A binding line for gathering a plurality of signatures to form books, comprising:*

*a plurality of packer boxes for delivering an associated signature to be gathered to form first and second books;*

*a feeder system operatively associated with at least one of the packer boxes that includes a conveyor and a plurality of feeder boxes, each of the feeder boxes being adapted to deliver a distinct signature to the associated packer box; and*

*a control system operatively connected to the packer boxes and being adapted to activate the packer boxes to thereby deliver a set of signatures to a gathering conveyor, the control system further being operatively connected to the feeder boxes and being adapted to activate a selected one of the feeder boxes to thereby deliver a selected set of distinct signatures from the feeder system to the associated packer box to form the first book and activate a second selected one of the feeder boxes to deliver a second selected set of distinct signatures from the feeder system to the associated packer box to form the second book.*

*17. The binding line of claim 16, wherein the feeder system further includes a printer positioned to apply a predetermined printed message to a reserved portion of the signatures delivered from the feeder boxes prior to delivery to the associated packer box.*

*18. The binding line of claim 17, wherein each of the signatures has a backbone and the printer applies the printed message perpendicular to the backbone.*

*19. The binding line of claim 17, wherein the control system is in communication with the printer to determine the content of the printed message applied to the signatures.*

*20. The binding line of claim 17, wherein the conveyor includes an output end for delivering the signatures from the feeder boxes to the associated packer box and the printer is positioned adjacent the output end of the conveyor.*

*21. The binding line of claim 17, wherein the control system being adapted to activate a selected one of the feeder boxes comprises being adapted to activate a combination of the feeder boxes including the selected one of the feeder boxes to deliver a plurality of distinct signatures from the feeder system to the associated packer box to form the first book.*

*22. A feeder system for delivering signatures to an associated one of a plurality of packer boxes on a binding line, comprising:*

*a plurality of feeder boxes each adapted to deliver a distinct signature to the associated one of the packer boxes; and*

*a primary controller for activating the packer boxes to thereby deliver a selected set of signatures to a gathering conveyor, the primary controller being operatively connected to a feed system controller for activating a selected one of the feeder boxes to thereby deliver a first selected one of the distinct signatures from the plurality of feeder boxes to the associated packer box at a first time and for activating a second selected one of the feeder boxes to thereby deliver a second selected one of the distinct signatures different from the first selected one of the signatures at a second time.*

*23. The feeder system of claim 22, further comprising a printer for applying a predetermined customized or personalized printed message to a reserved portion of the signatures delivered from the feeder boxes prior to delivery to the associated one of the packer boxes.*

*24. The feeder system of claim 23, wherein each of the signatures has a backbone and the printer applies the printed message perpendicular to the backbone.*

*25. The feeder system of claim 23, wherein the primary controller is in communication with the printer to determine the content of the printed message applied to the signatures.*

*26. The feeder system of claim 22, including a feed conveyor for delivering the distinct signatures from the feeder boxes to the associated one of the packer boxes.*

*27. The feeder system of claim 26, wherein the feed conveyor has an output end, and a printer is positioned adjacent the output end of the feed conveyor.*

*28. The feeder system of claim 22, wherein the primary controller being operatively connected to the feed system controller for activating a selected one of the feeder boxes comprises activating a first combination of the feeder boxes including the selected one of the feeder boxes to deliver a first combination of signatures including the first selected one of the distinct signatures from the plurality of feeder boxes to the associated packer box and wherein activating a second selected one of the feeder boxes comprises activating a second combination of the feeder boxes including the second selected one of the feeder boxes to deliver a second combination of signatures including the second selected one of the distinct signatures.*

*29. A method for expanding the capacity of a binding line having a plurality of packer boxes, comprising the steps of:*

*operatively connecting a plurality of feeder boxes with an associated one of the packer boxes, supplying each of the feeder boxes with a distinct signature; and*

*controlling the feeder boxes to thereby deliver a selected first signature to the feed conveyor for delivery to the selected one of the packer boxes and to deliver a selected second signature different from the first signature to the selected one of the packer boxes.*

*30. The method of claim 29, wherein selectively controlling the feeder boxes includes programming a controller to select the distinct signature to be delivered to the packer box.*

*31. The method of claim 29, further comprising applying printed material to the signatures during delivery to the associated one of the packer boxes.*

*32. The method of claim 29, wherein controlling the feeder boxes includes programming a controller to apply customized or personalized information on the signatures.*

*33. The method of claim 29, wherein controlling the feeder boxes to thereby deliver the selected first signature to the feed conveyor comprises controlling the feeder boxes to thereby deliver a selected first combination of signatures to the feed conveyor for delivery to the selected one of the packer boxes.*

*34. A feeder assembly for use with a binding line, comprising:*

*a feed conveyor configured to be operatively coupled to the binding line;*

*a plurality of feeder boxes operatively coupled to the feed conveyor and configured to hold signatures; and*

*a primary controller for activating packer boxes to thereby deliver a selected set of signatures to a gathering conveyor, the primary controller being operatively connected to a feed system controller for activating a selected one of the feeder boxes to thereby deliver a selected one of the distinct signatures from the plurality of feeder boxes to an associated packer box and for activating a second selected one of the feeder boxes to thereby deliver a second selected one of the distinct signatures from the plurality of feeder boxes to the associated packer box.*

*35. A feeder assembly as defined in claim 34, wherein the feed conveyor is configured to be operatively associated with the binding line via a packer box associated with the binding line.*

*36. A feeder assembly as defined in claim 34, further comprising a printer disposed adjacent to the feed conveyor to print on the at least one of the signatures.*

*37. A feeder assembly as defined in claim 34, wherein each of the feeder boxes is configured to hold a distinct signature.*

*38. A feeder assembly as defined in claim 34, wherein the primary controller activating a selected one of the feeder boxes comprises causing the feeder boxes to selectively deliver a first combination of the signatures and activating a second selected one of the feeder boxes comprises causing the feeder boxes to selectively deliver a second combination of the signatures, wherein the first combination of the signatures is different from the second combination of the signatures.*

* * * * *